US012619242B2

(12) United States Patent
    Thomas et al.

(10) Patent No.: US 12,619,242 B2
(45) Date of Patent: May 5, 2026

(54) FACILITY SENSORY SYSTEM FOR MONITORING, GUIDING, AND PROTECTING FLEXIBLE MODULAR PLATFORMS MOVING THROUGH AN ASSEMBLY LINE

(71) Applicant: Ford Global Technologies, LLC, Dearborn, MI (US)

(72) Inventors: Galen Keith Thomas, Dearborn, MI (US); Kerry Lance Paskell, Detroit, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1045 days.

(21) Appl. No.: 17/165,470

(22) Filed: Feb. 2, 2021

(65) Prior Publication Data

US 2021/0394845 A1     Dec. 23, 2021

Related U.S. Application Data

(63) Continuation-in-part of application No. 16/909,462, filed on Jun. 23, 2020, now Pat. No. 11,720,095.

(51) Int. Cl.
    *G05D 1/00* (2024.01)
    *G05B 19/418* (2006.01)
    (Continued)

(52) U.S. Cl.
    CPC ..... *G05D 1/0291* (2013.01); *G05B 19/41895* (2013.01); *G05D 2107/70* (2024.01)

(58) Field of Classification Search
    CPC ............... G05D 1/0027; G05D 1/0297; G05D 2201/0216; G05D 1/0022; G05D 1/0291; G05B 19/41895; G05B 19/41805; G05B 2219/50393; G05B 2219/32388; G05B 2219/31044; B62D 65/022

See application file for complete search history.

(56)                   References Cited

U.S. PATENT DOCUMENTS 7,036,848 B2     5/2006  Chernoff et al.
9,607,285 B1 *   3/2017  Wellman ............. G05D 1/0291
                   (Continued)

FOREIGN PATENT DOCUMENTS

CN          109625092          4/2019

*Primary Examiner* — Khoi H Tran
*Assistant Examiner* — Tanner L Cullen
(74) *Attorney, Agent, or Firm* — Burris Law, PLLC

(57)               ABSTRACT

A facility-based sensory system for the manufacture of modular vehicle subassemblies (MVSs) includes facility-based sensors and zone controllers. Each of the facility-based sensors is configured to be in communication with and transmit proximity data and/or vision data to the zone controllers. And each of the zone controllers is configured to be assigned to one of a plurality of assembly zones along an assembly line such that a MVS moving through the plurality of assembly zones is detected by the plurality of facility-based sensors and the detection is transmitted to the plurality of zone controllers. An onboard controller is included and configured to be attached to the MVS moving through the plurality of assembly zones. The onboard controller is configured to receive instructions from the plurality of zone controllers such that monitoring and directing of the MVS moving through the plurality of assembly zones is provided.

20 Claims, 8 Drawing Sheets

(51) Int. Cl.
    *B62D 65/02*         (2006.01)
    *G05D 107/70*      (2024.01)

(56)           References Cited

U.S. PATENT DOCUMENTS

| | | | |
|---|---|---|---|
| 10,322,802 B1 * | 6/2019 | Krishnaswamy .... | G01C 21/206 |
| 2012/0053775 A1 * | 3/2012 | Nettleton ................ | E21C 41/26 |
| | | | 701/24 |
| 2018/0259975 A1 * | 9/2018 | Dold ........................ | H04W 4/44 |
| 2018/0275681 A1 * | 9/2018 | Gariepy ........... | G05B 19/41805 |
| 2020/0073363 A1 * | 3/2020 | Albrecht ................. | H04W 4/38 |
| 2020/0140028 A1 * | 5/2020 | Wells ................... | G05D 1/0225 |
| 2020/0174459 A1 * | 6/2020 | Sasaki ................ | G05B 19/4185 |
| 2020/0209870 A1 * | 7/2020 | Khasawneh ......... | G05D 1/0276 |
| 2021/0339396 A1 * | 11/2021 | Denenberg ............. | B25J 9/1697 |

* cited by examiner

FACILITY SENSORY SYSTEM FOR MONITORING, GUIDING, AND PROTECTING FLEXIBLE MODULAR PLATFORMS MOVING THROUGH AN ASSEMBLY LINE

CROSS-REFERENCE TO RELATED APPLICATIONS

This application claims the benefit of and is a continuation-in-part of U.S. patent application Ser. No. 16/909,462 filed on Jun. 23, 2020, which is commonly assigned with the present application. This application is also related to co-pending applications filed concurrently herewith titled "FLEXIBLE MODULAR PLATFORM", "METHOD OF VEHICLE ASSEMBLY INCLUDING MODULAR VEHICLE SUBASSEMBLY CONTROLS, COMMUNICATION AND MANUFACTURE", "FLEXIBLE MODULAR PLATFORM PLANT NAVIGATION SYSTEM", and "METHOD OF STORING, PROCESSING, AND TRANSMITTING DIGITAL TWINS FOR FLEXIBLE MODULE PLATFORMS AND VEHICLES", which are commonly assigned with the present application. The contents of these patent applications are incorporated herein by reference in their entireties.

FIELD

The present disclosure relates to assembly lines and particularly to sensors on assembly lines.

BACKGROUND

The statements in this section merely provide background information related to the present disclosure and may not constitute prior art.

Vehicles are typically manufactured in assembly plants designed and built to support a projected vehicle assembly volume based on mechanical infrastructure requirements needed to support manufacturing operations. And such mechanical infrastructure requirements typically include conveyer systems and/or automatic guided vehicle (AGV) based systems to move vehicle subassemblies from station to station along an assembly line. However, the time, investment and capital expenditure needed to build conveyer systems or to adapt AGVs for specific application tasks can be prohibitive.

These issues associated with assembly lines in vehicle assembly plants, among other issues related to manufacturing different product configurations in the same assembly facility, are addressed by the present disclosure.

SUMMARY

This section provides a general summary of the disclosure and is not a comprehensive disclosure of its full scope or all of its features.

In one form of the present disclosure, a facility-based sensory system for the manufacture of modular vehicle subassemblies (MVSs) includes a plurality of facility-based sensors and a plurality of zone controllers. Each of the plurality of facility-based sensors is configured to be in communication with and transmit at least one of proximity data and vision data to at least one of the plurality of zone controllers. And each of the plurality of zone controllers is configured to be assigned to at least one of the plurality of assembly zones such that a MVS moving through the plurality of assembly zones is detected by the plurality of facility-based sensors and the detection transmitted to the plurality of zone controllers. An onboard controller is included and configured to be attached to the MVS moving through the plurality of assembly zones. In at least one variation of the present disclosure, the onboard controller is configured to receive the instructions from at least one of the plurality of zone controllers assigned to an assembly zone where the MVS is located such that at least one of monitoring of the MVS and directing the MVS moving through the plurality of assembly zones is provided.

In some variations, the proximity data and/or vision data comprises at least one of geometric data, thermal data, acoustic data, vibrational data, and optical data.

In at least one variation the plurality of facility-based sensors comprises at least one vision sensor array configured to transmit pathway alignment vision data on the MVS moving through at least one of the plurality of assembly zones. In the alternative, or in addition to, the plurality of facility-based sensors comprises at least one proximity sensor array configured to transmit at least one of pathway alignment data on the MVS moving through one of the plurality of assembly zones, detection data on the MVS entering one of the plurality of assembly zones, tracking data on the MVS moving through one of the plurality of assembly zones, distance data on the MVS approaching one of the plurality of assembly zones, distance data on the MVS leaving one of the plurality of assembly zones, speed data on at least one object approaching the MVS, location data on at least one object approaching the MVS, and distance data between at least one object and the MVS in one of the plurality of assembly zones.

In some variations, each of the plurality of zone controllers is configured to receive the at least one of the proximity data and vision data and transmit at least one command to the onboard controller of the MVS in response to the received proximity data and/or vision data. In such variations the at least one command can be at least one MVS operational command and the least one MVS operational command can be at least one of a path alignment command, a tracking command, and an obstacle avoidance command for the MVS moving through one of the plurality of assembly zones. And in at least one variation, the plurality of facility-based sensors are configured to wirelessly transmit the proximity data and/or vision data to the plurality of zone controllers.

In some variations, each of the plurality of transient data sensors is configured to transmit at least one of performance data, trouble code data, assembly testing data, and proximity data on the MVS moving through one of the plurality of assembly zones. In such variations, the performance data on the MVS can include performance data from at least one of a propulsion system, a steering system, a braking system, and a suspension system of the MVS moving through one of the plurality of assembly zones. And in at least one variation, the plurality of transient data sensors are configured to wirelessly transmit the transient data to the onboard controller.

In some variations, the system further includes a central management system configured to receive data from the plurality of zone controllers and transmit at least one MVS command to each of the plurality of zone controllers, and the at least one MVS command can be a response to the data received from the plurality of zone controllers. In such variations, the plurality of zone controllers are each configured to transmit the at least one MVS command to the onboard controller of the MVS moving through one of the plurality of assembly zones. And in at least one variation, the central management system is configured to coordinate movement of a plurality of MVSs moving through the plurality of assembly zones.

In another form of the present disclosure, a facility-based sensory system for the manufacture of MVSs includes a plurality of facility-based sensors assigned to a plurality of assembly zones such that each of the plurality of assembly zones has at least one of the plurality of facility-based sensors assigned thereto. Also, a plurality of zone controllers assigned to the plurality of assembly zones is included such that each of the plurality of assembly zones has at least one of the plurality of zone controllers assigned thereto and each of the plurality of facility-based sensors assigned to a given assembly zone is configured to be in communication with and transmit at least one of proximity data and vision data to the at least one of the plurality of zone controllers assigned to the given assembly zone. A plurality of transient data sensors and an onboard controller configured to be attached to the MVS are included and each of the plurality of transient data sensors is configured to transmit transient signals from the MVS to the onboard controller. The onboard controller is configured to receive the transient signals and transmit transient data to at least one of the plurality of zone controllers assigned to an assembly zone where the MVS is located such that manufacturing information on the MVS moving through the plurality of assembly zones is detected and transmitted.

In some variations, the plurality of facility-based sensors includes at least one of a plurality of vision sensor arrays configured to transmit pathway alignment vision data on the MVS moving through the plurality of assembly zones, and a plurality of proximity sensor arrays configured to transmit at least one of pathway alignment data on the MVS moving through one of the plurality of assembly zones, detection data on the MVS entering one of the plurality of assembly zones, tracking data on the MVS moving through one of the plurality of assembly zones, distance data on the MVS approaching one of the plurality of assembly zones, distance data on the MVS leaving one of the plurality of assembly zones, speed data on at least one object approaching the MVS, location data on at least one object approaching the MVS, and distance data between at least one object and the MVS moving through the plurality of assembly zones.

In at least one variation the system further includes a central management system configured to receive data from the plurality of zone controllers and transmit at least one MVS command to each of the plurality of zone controllers. In some variations, the at least one MVS command is a response to the data received from the plurality of zone controllers, and the plurality of zone controllers are each configured to transmit the at least one MVS command to the onboard controller of the MVS moving through one of the plurality of assembly zones.

In still another form of the present disclosure, a facility-based sensory system for the manufacture of MVSs includes a plurality of facility-based sensors assigned to a plurality of assembly zones such that each of the plurality of assembly zones has at least one of the plurality of facility-based sensors assigned thereto. A plurality of zone controllers assigned to the plurality of assembly zones is included such that each of the plurality of assembly zones has at least one of the plurality of zone controllers assigned thereto. Each of the plurality of facility-based sensors is assigned to a given assembly zone and is configured to be in communication with and transmit at least one of proximity data and vision data to at least one of the plurality of zone controllers assigned to the given assembly zone. A plurality of transient data sensors and an onboard controller configured to be attached to the MVS are included and each of the plurality of transient data sensors is configured to transmit transient signals from the MVS to the onboard controller. In at least one variation, the onboard controller is configured to receive the transient signals and transmit transient data to at least one of the plurality of zone controllers assigned to an assembly zones where the MVS is located such that manufacturing information on the MVS moving through the plurality of assembly zones is detected and transmitted. A central management system configured to receive data from the plurality of zone controllers and transmit at least one MVS command to each of the plurality of zone controllers is included. In some variations, the at least one MVS command is a response to the data received from the plurality of zone controllers, and the plurality of zone controllers are each configured to transmit the at least one MVS command to the onboard controller of the MVS moving through one of the plurality of assembly zones.

In at least one variation, the plurality of facility-based sensors comprises at least one vision sensor array configured to transmit pathway alignment vision data on the MVS located in one of the plurality of assembly zones, and at least one proximity sensor array configured to transmit at least one of pathway alignment data on the MVS moving through one of the plurality of assembly zones, detection data on the MVS entering one of the plurality of assembly zones, tracking data on the MVS moving through one of the plurality of assembly zones, distance data on the MVS approaching one of the plurality of assembly zones, distance data on the MVS leaving one of the plurality of assembly zones, speed data on at least one object approaching the MVS, location data on at least one object approaching the MVS, and distance data between at least one object and the MVS in one of the plurality of assembly zones.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
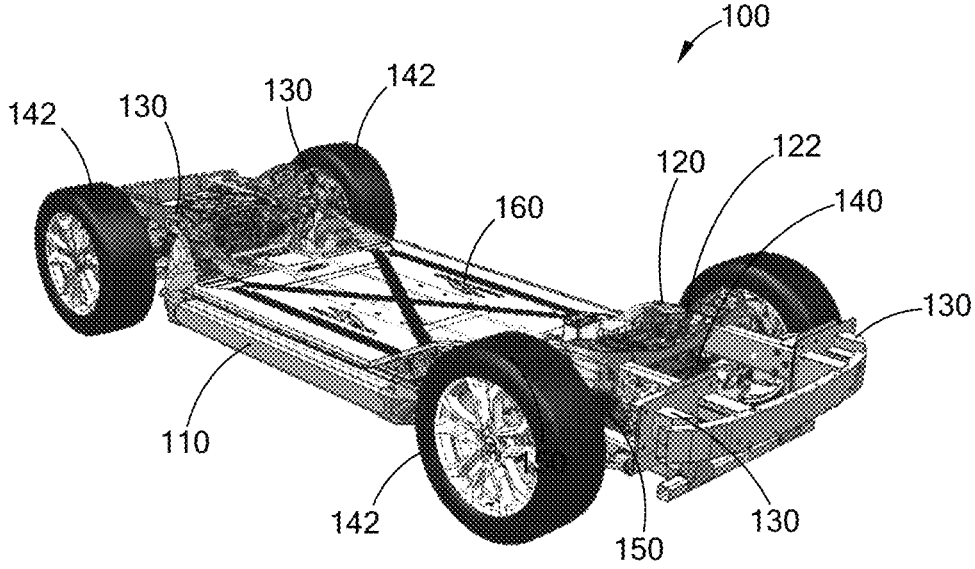
FIG. 1 is a perspective view of a modular vehicle subassembly according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a modular vehicle subassembly (MVS) 100 (also known as a "flexible modular platform") according to the teachings of the present disclosure is shown. The MVS 100 includes a vehicle frame 110, an onboard controller 120, an onboard communications link 122, transient data sensors 130, a drive system 140, wheels 142 mounted on the vehicle frame 110, a steering system 150, a braking system 155, and a propulsion system 160. As used herein, the phrase "communication link" refers to a communication channel that connects two or more devices for the purpose of data transmission. In at least one variation the onboard communications link 122 is a wireless communications link with a wireless signal receiver/transmitter that includes an antenna. In some variations, the MVS 100 is for an electric or hybrid vehicle and the propulsion system 160 includes one or more charged batteries that provides energy to the onboard controller 120, transient data sensors 130, drive system 140, steering system 150, and braking system 155. In at least one variation the braking system 155 is an integrated braking system with the drive system 140. In the alternative, or in addition to, the braking system 155 is a traditional disc type braking system coupled to the wheels 142.

The MVS 100, and other MVSs disclosed herein, is manufactured at a vehicle assembly facility and is self-transportable. That is, the MVS 100 is configured to move using its own power and steering through the same vehicle assembly facility where it was manufactured and/or through a separate vehicle assembly facility where additional assembly operations occur. For example, a plurality of MVSs 100 (also referred to herein simply as "MVSs 100") can be wireless tethered together and/or wirelessly tethered to an assembly line infrastructure and thereby move under remote or autonomous control using their own power and steering along a predefined path through one or more assembly zones as discussed in greater detail below.

In some variations of the present disclosure, the one or more assembly zones are part of a vehicle assembly facility that assembles a "top hat" onto the MVSs 100. As used herein the term phrase "assembly zone" refers to area, station or region of an assembly line where a predetermined number of components or parts are assembled onto a MVS 100 moving along the assembly line. And as used herein the phrase "top hat" refers to one or more vehicle upper body structures that can share a common platform (i.e., a common MVS 100). For example, the upper body structures can vary from a crossover vehicle to a sedan vehicle to a coupe vehicle. Accordingly, vehicle assembly facilities that assemble different vehicle upper body structures onto a common MVS 100 enhance economies of scale and product differentiation and are included within the teachings of the present disclosure.

Figure 2:
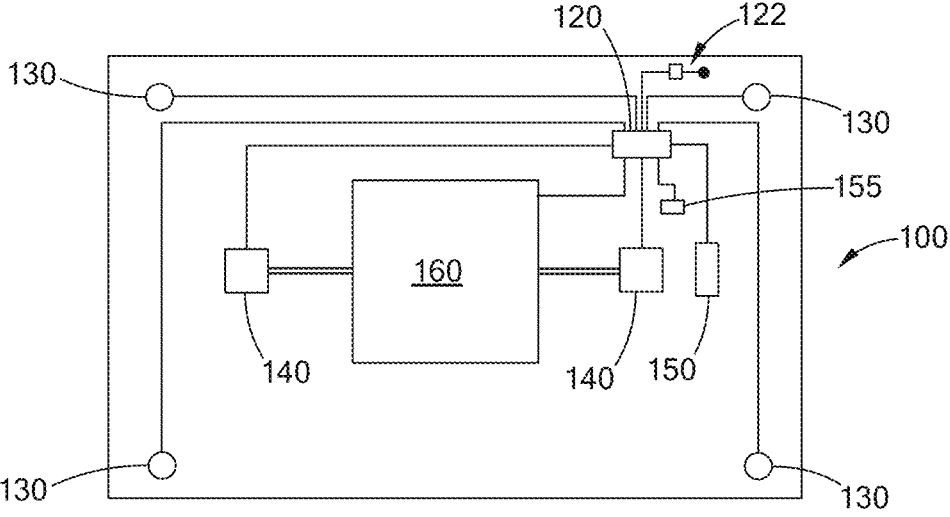
FIG. 2 is a block diagram of a remote controlled modular vehicle subassembly according to the teachings of the present disclosure.

Referring to FIG. 2, an example functional block diagram of the MVS 100 is shown. The MVS 100 includes the onboard controller 120, the onboard communications link 122, transient data sensors 130, the drive system 140, the steering system 150, the braking system 155, and the propulsion system 160. Also, and as shown in FIG. 2, the onboard controller 120 is in communication with the onboard communications link 122, transient data sensors 130, drive system 140, steering system 150, braking system 155, and propulsion system 160.

The transient data sensors 130 are configured to transmit at least one of signals, data, and commands (also referred to herein as "information") to the onboard controller 120, e.g., via onboard communications link 122, and the onboard controller 120 is configured to receive the information from the transient data sensors 130. In some variations, the onboard controller 120 is configured to transmit additional information in response to or as a function of the information received from the onboard communications link 122 and/or transient data sensors 130. For example, in some variations the onboard controller 120 transmits additional information to the transient data sensors 130, the drive system 140, the steering system 150, the braking system 155, and/or the propulsion system 160 (e.g., via the onboard communications link 122). And in at least one variation the onboard controller 120 transmits additional information to an external controller, e.g., via the onboard communications link 122.

The transient data sensors 130 of the MVS 100 can be proximity sensors, vision sensors, fluid level sensors, energy level sensors, electrical connection sensors, among others, that provide transient data to the onboard controller 120. Non-limiting examples of transient data provided by the transient data sensors 130 include data on or related to MVS 100 location, MVS 100 position, MVS 100 movement, obstacle detection along a path the MVS 100 is moving along, general environmental conditions around the MVS 100, fluid level in a container assembled onto the MVS 100, pressure level in a container assembled onto the MVS 100, charge level of an electric battery of the MVS 100, resistance of a connection between two electrical components assembled onto the MVS 100, operation of a component assembled onto the MVS 100, among others. Accordingly, the transient data sensors 130 provide notification on how a given MVS 100 is performing operational activities such as alignment on an assembly path, tracking of a given MVS 100 along the assembly path, and obstacle avoidance on the assembly path as the MVS 100 moves within a vehicle assembly facility. In addition, the transient data sensors 130 can provide assembly information of a top hat being assembled onto the MVS 100 as the MVS 100 moves through one or more assembly zones.

The onboard controller 120 is configured to direct the propulsion system 160 to provide power to the drive system 140 and direct the drive system 140 to drive at least one of the wheels 142 such that the MVS 100 moves across a surface (e.g., a floor or road). As used herein, the term 'drive" refers to rotating an object (e.g., a wheel) by applying a force causing the object to rotate. Accordingly, the propulsion system 160 is configured to provide power to the drive system 140 and the drive system 140 is configured to rotate the wheels 142.

In some variations, the propulsion system 160 is an electric propulsion system with one or more electric batteries that provide electric power to the drive system 140. In other variations, the propulsion system 160 is a hybrid propulsion system with one or more electric batteries and an internal combustion engine (ICE) that provides a combination of electric power and mechanical power (converted from chemical energy) to the drive system 140. In at least one variation the MVS 100 includes a hybrid propulsion system that uses electric power to move through one or more assembly zones.

The onboard controller 120 is also configured to direct the steering system 150 to steer at least one of the wheels 142 (e.g., two front wheels 142) such that the MVS 100 follows or moves along a desired pathway. As used herein, the term "steer" or "steering" refers to guiding or controlling directional movement of a vehicle by turning at least one wheel of the vehicle. Accordingly, the steering system 150 is configured to change a course of direction of the MVS 100. As used herein the phrase "course of direction" refers to a direction or path along which the MVS 100 is moving.

In at least one variation the onboard controller 120 is configured to direct the braking system 155 to apply a braking force such that the wheels 142 are inhibited from turning or rotating. And in some variations the onboard controller 120 is configured to direct the braking system 155 to apply an emergency braking force such that the MVS 100 and/or other MVSs 100 stop moving, e.g., when an obstacle is detected approaching a predefined pathway the MVS 100 is moving along.

Figure 3B:
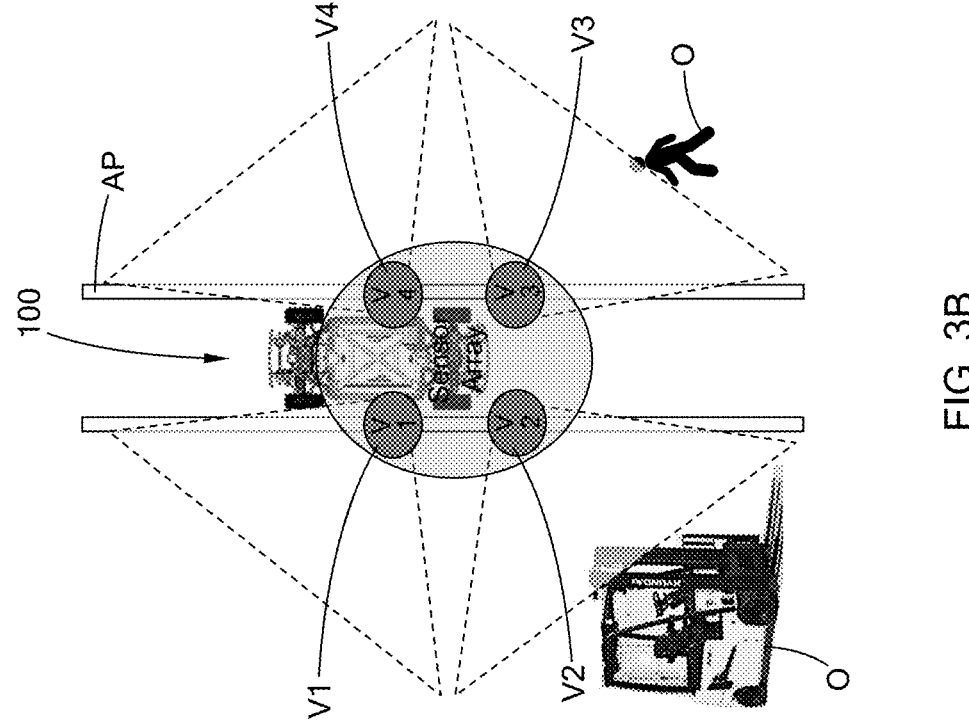
FIG. 3B shows the vision sensor array in FIG. 3A executing a wide field of view scan according to the teachings of the present disclosure.
Figure 3A:
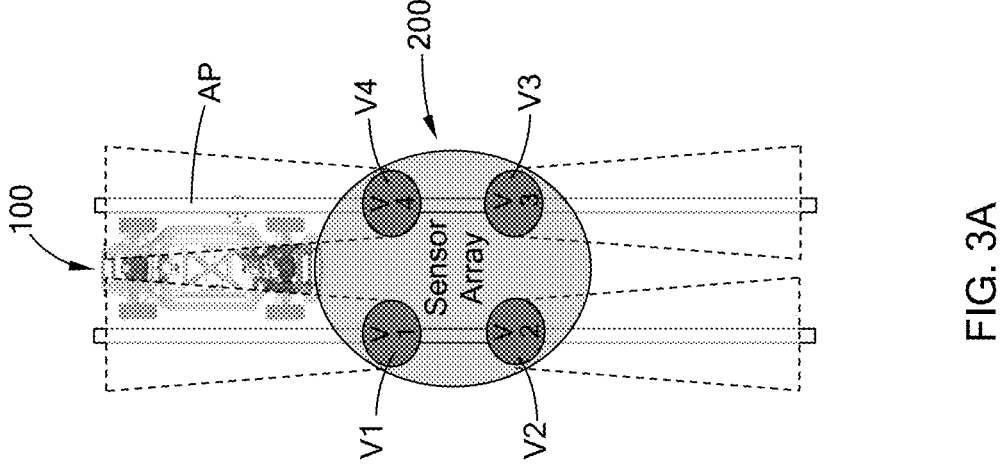
FIG. 3A shows a vision sensor array executing a narrow field of view scan according to the teachings of the present disclosure.

Referring to FIGS. 3A and 3B, one non-limiting example of a vision sensor array 200 (also referred to herein as "a plurality of facility-based sensors") is shown positioned along an assembly path 'AP' on which a plurality of MVSs 100 move along. The vision sensor array 200 includes a plurality of vision sensors V1, V2, V3, V4 configured to provide or monitor one or more fields of view and thereby provide vision data on one or more areas proximal to the vision sensor array 200 and a MVS 100 moving along the assembly path AP. For example, in some variations the plurality of vision sensors V1-V4 monitor and provide vision data on a narrow field of view as shown in FIG. 3A. In the alternative, or in addition to, the plurality of vision sensors V1-V4 monitor and provide vision data on a wide field of view as shown in FIG. 3B.

Non-limiting examples of vision data provided by the narrow field of view (FIG. 3A) include alignment data on a MVS 100 moving along the assembly path AP, obstacle detection data on the assembly path AP, among others. And non-limiting examples of vision data provided by the wide field of view (FIG. 3B) include notification data on an object on the assembly path AP, notification data on an object approaching the assembly path AP, notification data on an object approaching a MVS 100 moving along the assembly path AP, tracking data on an object approaching the assembly path AP, tracking data on an object approaching a MVS 100 moving along the assembly path AP, among others. In some variations the plurality of vision sensors V1-V4 are monochrome vision sensors, while in other variations the plurality of vision sensors V1-V4 are color vision sensors. And in at least one variation the plurality of vision sensors V1-V4 are a combination of monochrome vision sensors and color vision sensors.

Figure 4A:
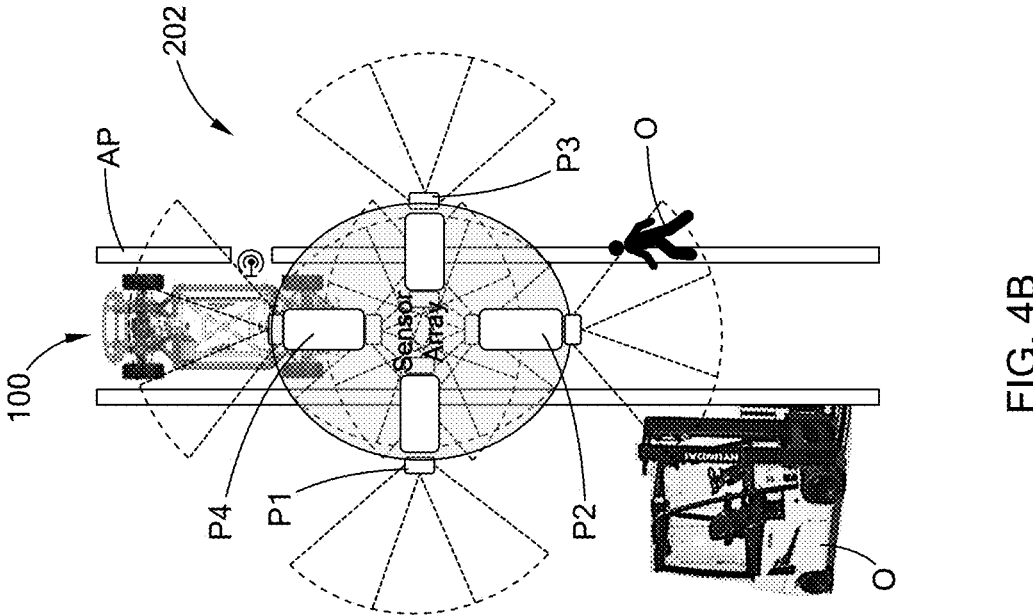
FIG. 4A shows a proximity sensor array detecting a modular vehicle subassembly on an assembly pathway according to the teachings of the present disclosure.
Figure 4B:
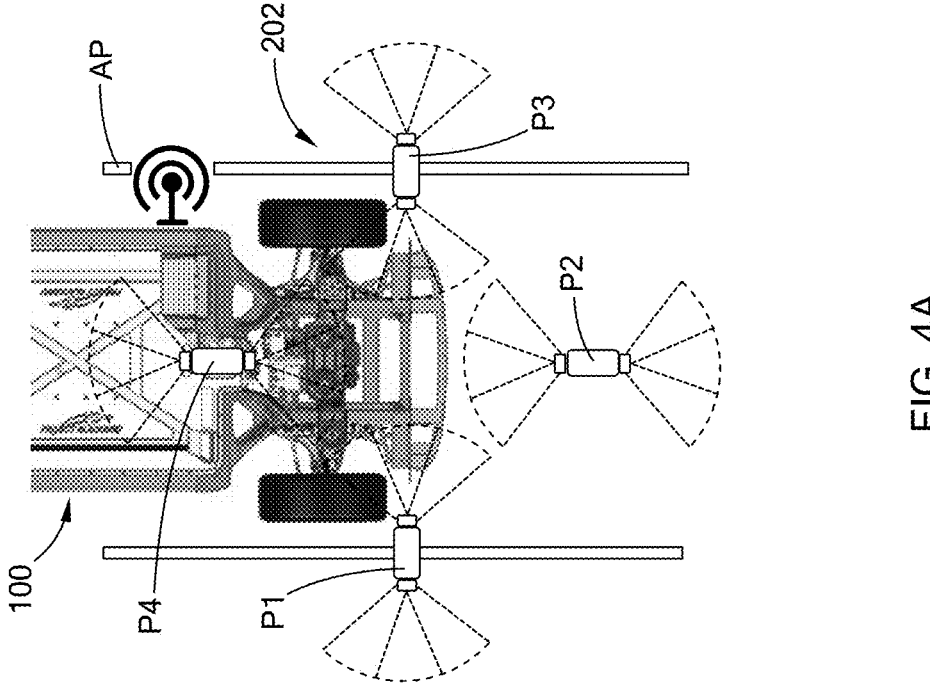
FIG. 4B shows the proximity sensor array in FIG. 4A detecting an object on or approaching the modular vehicle assembly and/or the assembly pathway according to the teachings of the present disclosure.

Referring to FIGS. 4A and 4B, a non-limiting example of a proximity sensor array 202 (also referred to herein as "a plurality of facility-based sensors") is shown positioned along an assembly path AP on which a plurality of MVSs 100 move along. The proximity sensor array 202 includes a plurality of proximity sensors P1, P2, P3, P4 configured to provide proximity data on one or more areas proximal to the proximity sensor array 202 and a MVS 100 moving along the assembly path AP. For example, in some variations the plurality of proximity sensors P1-P4 monitor and provide proximity data on a MVS 100 as shown in FIG. 4A. In the alternative, or in addition to, the plurality of proximity sensors P1-P4 monitor and provide proximity data on objects 'O' on or approaching the assembly path as shown in FIG. 4B.

Non-limiting examples of proximity data include speed data on a MVS 100 moving along the assembly path AP, location data on a MVS 100 moving along the assembly path AP, distance data on a MVS 100 moving along the assembly path AP, speed data on an object approaching the assembly path AP, speed data on an object approaching a MVS 100 moving along the assembly path AP, location data on an object approaching the assembly path AP, location data on an object approaching a MVS 100 moving along the assembly path AP, distance data on an object approaching the assembly path AP, distance data on an object approaching a MVS 100 moving along the assembly path AP, among others. And non-limiting examples of the proximity sensors P1-P4 include doppler effect sensors, magnetic sensors, optical sensors, radar sensors, ultrasonic sensors, among others.

Figure 5:
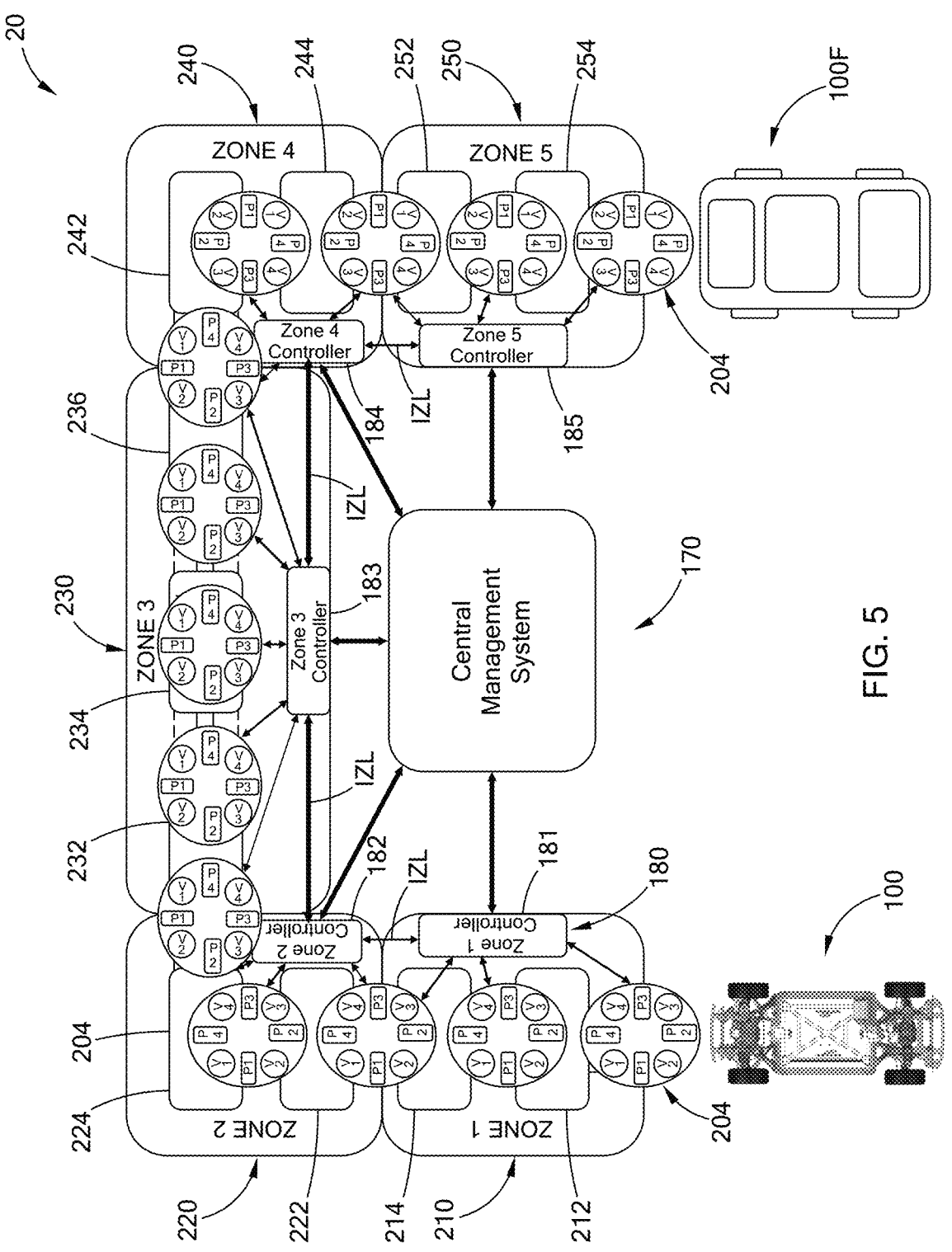
FIG. 5 shows a vehicle assembly facility according to the teachings of the present disclosure.

Referring to FIG. 5, a vehicle assembly facility 20 with facility integrated sensors for guidance and control of a plurality of MVSs 100 moving through five assembly zones 210, 220, 230, 240, 250 along an assembly path AP is shown. The vehicle assembly facility 20 includes a plurality of combined sensor arrays 204 (also referred to herein simply as "sensor arrays" and "a plurality of facility-based sensors") that assist in monitoring and controlling the plurality of MVSs 100 moving along the assembly path AP. The sensor arrays 204 provide at least one of provide geometric data, thermal data, acoustic data, vibrational data, and optical data. For example, in some variations the plurality of sensor arrays 204 include the plurality of vision sensors V1-V4 and the plurality of proximity sensors P1-P4. However, it should be understood that one or more of the sensor arrays 204 can include only the vision sensors V1-V4 or only the proximity sensors P1-P4. In addition, each of the plurality of sensor arrays 204 is not limited to four vision sensors and/or four proximity sensors as discussed above.

Each of the assembly zones 210-250 include at least one assembly station where at least one component or part is assembled onto a MVS 100. Non-limiting examples of assembly stations within the five assembly zones 210, 220, . . . 250 include a top hat core structural integration station 212 and a top hat/MVS engine data scan (EDS) integration station 214 in assembly zone 210, a heating, venting, and air conditioning (HVAC) and a trunk/frunk based system station 222, and a dash, flooring and carpet station 224 in assembly zone 220, an interior and seating station 232, a body panel support elements station 234, and a passenger door assembly station 236 in assembly zone 230, a body panels installation station 242 and a hood and hatch assemblies station 244 in assembly zone 240, and a glass and windshields station 252 and a final preparation and controller removal station 254 in assembly zone 250. It should be understood that various parts and components are assembled onto the MVS 100 at each of the stations such that an assembled vehicle 100A is provided when the MVS 100 exits assembly zone 250.

In some variations the vehicle assembly facility 20 includes a central management system 170 and a zone management system 180. In the example shown in FIG. 5, the zone management system 180 has five zone controllers 181, 182, 183, 184, 185 for the five assembly zones 210, 220, . . . 250 and each of five zone controllers 181, 182, . . . 185 are in communication with adjacent zone controllers via interzone links 'IZL'. The central management system 170 controls the movement of the MVSs 100 remotely through assembly zones 210, 220, . . . 250 and assembly stations within each zone.

It should be understood that the plurality of combined sensor arrays 204 assist in tracking movement of a plurality of MVSs 100 through the vehicle assembly facility 20 by providing transient data to a respective zone controller 181, 182, . . . 185. It should also be understood that an assembly path AP for one MVS 100 is different than an assembly path AP for another MVS 100. For example the assembly path for one or more of the MVSs 100 may not include movement through one or more of the assembly zones 210, 220, . . . 250, and/or may include movement through additional zones not shown in FIG. 5. Also, one or more MVSs 100 can be redirected by the central management system 170 to a maintenance zone based on transient data received by one of the zone controllers 181, 182, . . . 185. And each of the MVSs 100 can be redirected or stopped based on an obstacle detection along, adjacent to, and/or within the assembly path AP for a given MVS 100.

Figure 6:
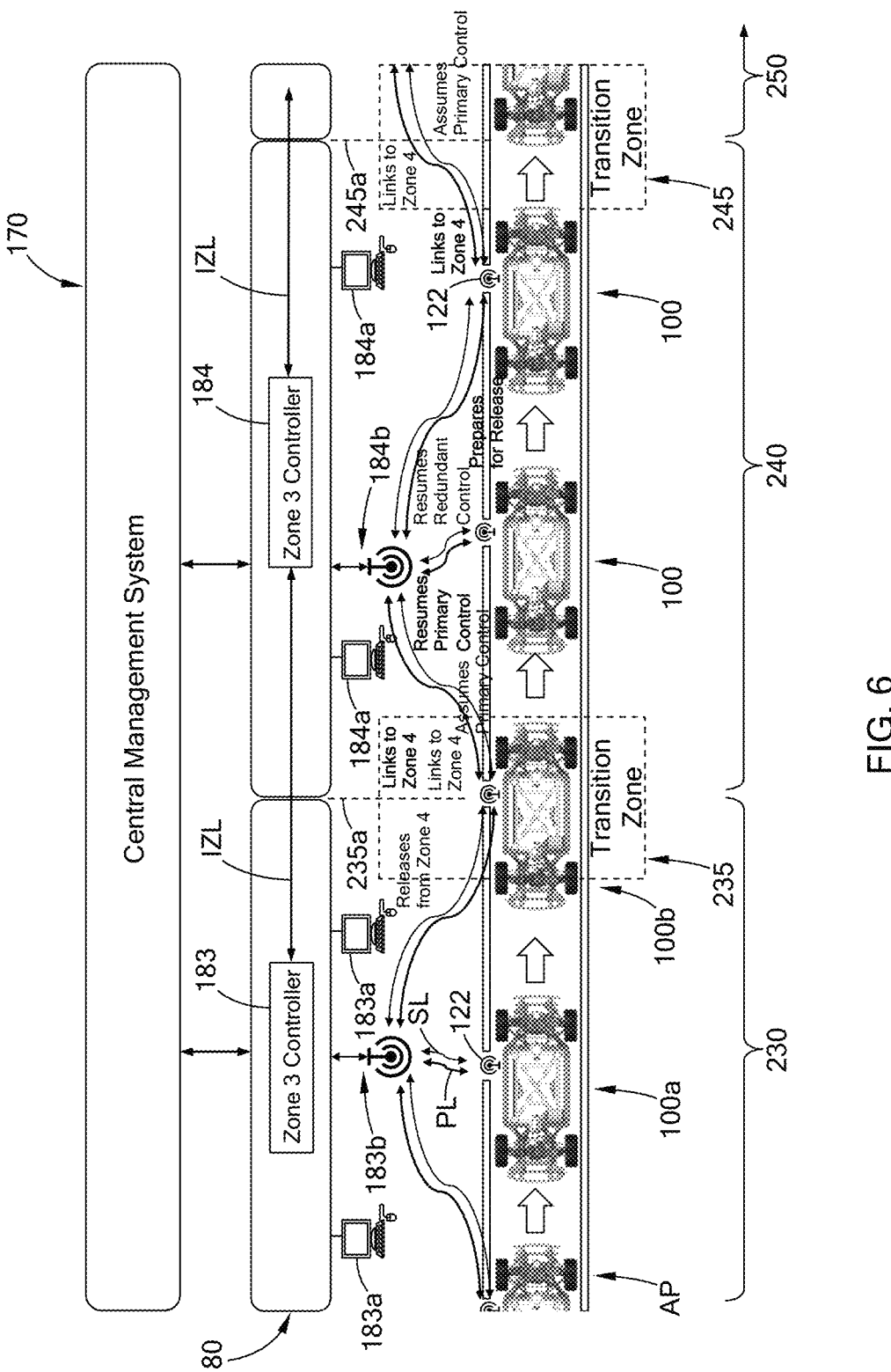
FIG. 6 shows a plurality of modular vehicle subassemblies moving through a plurality of assembly zones of the vehicle assembly facility in FIG. 5.

One example of a plurality of MVSs 100 moving along the assembly path AP in the vehicle assembly facility 20 is shown in FIG. 6. Particularly FIG. 6 shows movement of the plurality of MVSs 100 using their own power through assembly zones 230, 240, and 250. For a MVS 100a in assembly zone 230, the onboard controller 120 (FIG. 1) of the MVS 100a is in communication with the zone controller 183 via the onboard communications link 122 and a zone controller communications link 183b. In at least one variation, the zone controller 183 uses a dual band or dual channels to transmit and receive instructions and data and thereby remotely control the MVS 100a. For example, in some variations the zone controller 183 and the onboard controller 120 communicate using a primary link PL and a secondary link SL. In such variations, the primary link PL controls the movement of the MVS 100 and the secondary link SL monitors the movement of the MVS 100a. Also, it should be understood that using dual channels enhances connectivity between the zone controller 183 and the onboard controller 120.

As the zone controller 183 manages the operation and movement of the MVS 100a through assembly zone 230, the interior and seating are installed at station 232, body panel support elements are installed at station 234, and passenger doors are assembled and hung at station 236. In some variations of the present disclosure, the zone controller 183, and other zone controllers discussed herein, provide process related services such as instructions and/or data related to tracking of the MVS 100a (i.e., MVS tracking), guidance of the MVS 100a (i.e., MVS guidance), movement control and coordination of the MVS 100a (i.e., MVS movement control and coordination), and management of the signaling interface between the zone controller 183 and the onboard controller 120, among others.

"Hand-off" of control and management of a MVS 100b in a transition zone 235 between assembly zone 230 to assembly zone 240 is also shown in FIG. 6. Particularly, as the MVS 100b approaches zonal boundary 235a, i.e., a boundary between assembly zones 230 and 240, the MVS 100b moves into the transition zone 235. At a predefined distance from the zonal boundary 235a the zone controller 183 for assembly zone 230 releases or terminates the secondary link SL (shown by dotted line SL in FIG. 6) and the zone controller 184 for the assembly zone 240 picks up (i.e., establishes communication with) the MVS 100b via the secondary link SL extending between the zone controller 184 and the MVS 100b. The zone controller 183 for assembly zone 230 releases the primary link PL and the zone controller 184 for the assembly zone 240 establishes control of the MVS 100b via the primary link PL. The MVS 100 continues to move along the predetermined assembly path AP in assembly zone 240 with the primary link PL and the secondary link SL in communication with zone controller 184 via the onboard communications link 122 and the zone controller communications link 184b. It should be understood that in some variations of the present disclosure the interzone link IZL between the zone controllers 183 and 184 assists in the hand-off of control and management of the MVS 100 from assembly zone 230 to assembly zone 240.

Figure 7A:
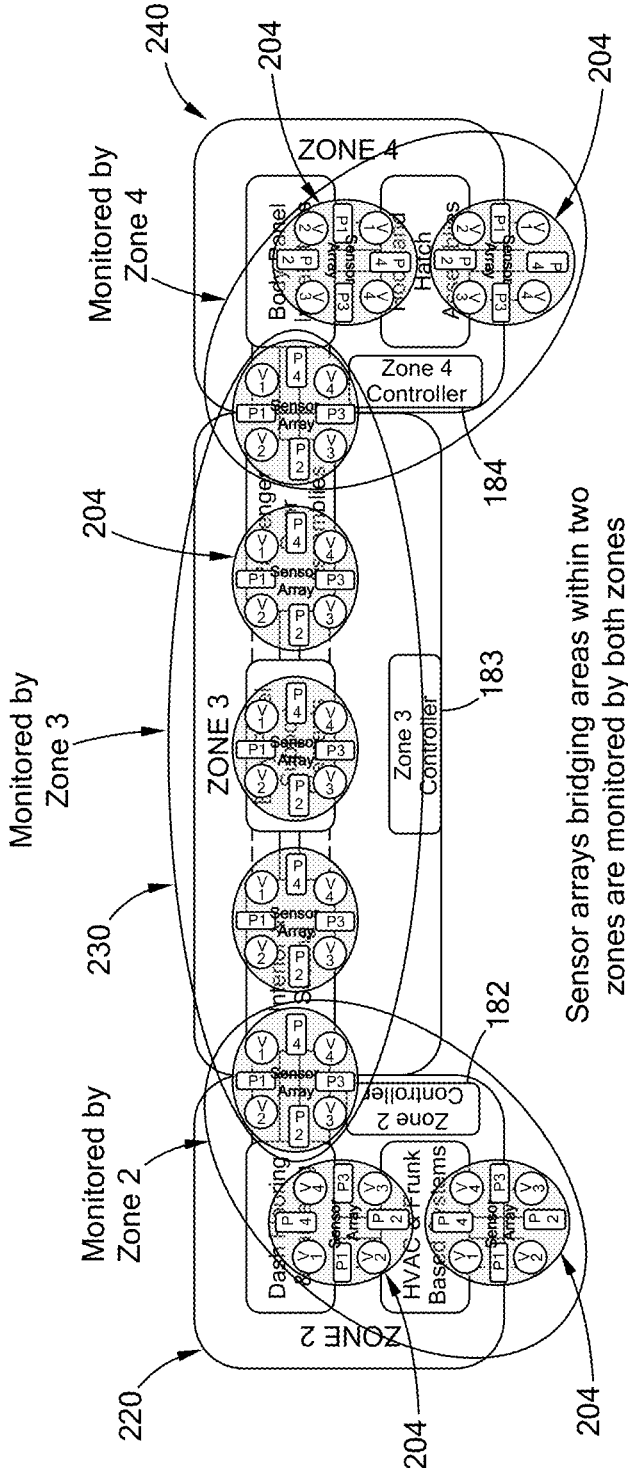
FIG. 7A shows monitoring of a plurality of sensor arrays positioned along an assembly path according to the teachings of the present disclosure.
Figure 7B:
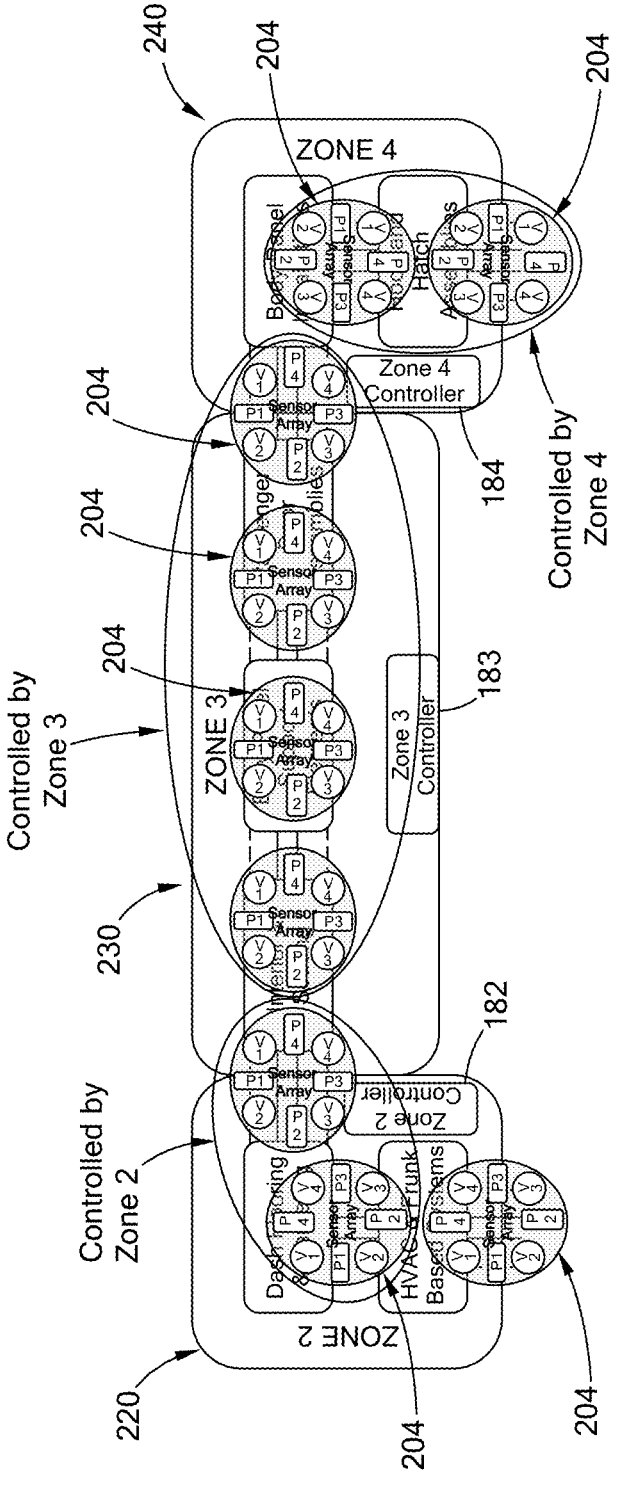
FIG. 7B shows control of a plurality of sensor arrays positioned along an assembly path according to the teachings of the present disclosure.

Referring now to FIGS. 7A-7B, one non-limiting example of monitoring sensor arrays 204 across assembly zones is shown in FIG. 7A and one non-limiting example of controlling sensor arrays 204 across assembly zones is shown in FIG. 7B. Particularly, one sensor array 204 is positioned in a transition zone 215 between the assembly zone 210 (not shown) and the assembly zone 220, one sensor array 204 is positioned within the assembly zone 220, one sensor array 204 is positioned in a transition zone 225 between the assembly zone 220 and the assembly zone 230, three sensor arrays 204 are positioned within the assembly zone 230, one sensor array 204 is positioned in a transition zone 235 between the assembly zone 230 and the assembly zone 240, one sensor array 204 is positioned within the assembly zone 240, and one sensor array 204 is positioned in a transition zone 245 between the assembly zone 240 and the assembly zone 250 not shown.

Referring particularly to FIG. 7A, the sensor array 204 positioned in the transition zone 225 is monitored by the zone controllers 182, 183 such that vision and/or proximity data detected and provided by the sensor array 204 is used for monitoring a MVS 100 leaving assembly zone 220 and entering assembly zone 230. Similarly, the sensor array 204 positioned in the transition zone 235 is monitored by the zone controllers 183, 184 such that vision and/or proximity data detected and provided by the sensor array 204 is used for monitoring a MVS 100 leaving assembly zone 230 and entering assembly zone 240. Stated differently, the sensor array 204 positioned in the transition zone 225 provides vision and/or proximity data to zone controller 182 and zone controller 183, and the sensor array 204 positioned in the transition zone 235 provides vision and/or proximity data to zone controller 183 and zone controller 184. It should be understood that in some variations of the present disclosure the interzone link IZL (FIG. 5) between the zone controllers 182 and 183 assists in sharing vision and/or proximity data from the sensor array 204 positioned in the transition zone 225 between the zone controllers 182 and 183, and the interzone link IZL between the zone controllers 183 and 184 assists in sharing vision and/or proximity data from the sensor array 204 positioned in the transition zone 235 between the zone controllers 183 and 184.

However, and with reference to FIG. 7B, in some variations the sensor array 204 positioned in the transition zone 225 is controlled only by zone controller 182 and the sensor array 204 positioned in the transition zone 235 is controlled only by zone controller 183.

It should be understood from the teachings of the present disclosure that a vehicle assembly facility with a plurality of assembly zones, facility-based sensors assigned to the plurality of assembly zones, a plurality of zone controllers assigned to the plurality of assembly zones, and a central management system is provided. The facility-based sensors detect and transmit vision and/or proximity data on MVSs moving through the plurality of assembly zones to the plurality of zone controllers. In some variations, the plurality of zone controllers transmit the vision and/or proximity data to the central management system. In such variations the central management system uses the vision and/or proximity data to remotely navigate the MVSs through the plurality of assembly zones using their own power. In other variations, the plurality of zone controllers use the vision and/or proximity data to remotely navigate the MVSs through the plurality of assembly zones using their own power. Accordingly, a vehicle assembly facility for assembling top hats onto MVSs using a reduced number of or no conveyors or AGVs is provided.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A facility-based sensory system for manufacture of modular vehicle subassemblies (MVSs), the system comprising:

a plurality of facility-based sensors configured to detect proximity data or vision data associated with an MVS moving through a transition zone disposed between a first assembly zone and a second assembly zone, and wherein the plurality of facility-based sensors is configured to transmit the proximity data or the vision data to at least one of a plurality of zone controllers; and an onboard controller configured to be attached to the MVS, wherein the onboard controller establishes a communication link with a first zone controller of the plurality of zone controllers in response to being located at a predefined distance from a zonal boundary associated with the second assembly zone based on the proximity data or the vision data received from one or more sensors of the plurality of facility-based sensors configured as proximity sensors and positioned in the transition zone, and wherein the onboard controller terminates a communication link with a second zone controller of the plurality of zone controllers in response to the establishment of the communication link with the first zone controller, and further wherein the first zone controller is associated with the second assembly zone and the second zone controller is associated with the first assembly zone.

2. The system according to claim 1, wherein the at least one of proximity data and vision data comprises at least one of geometric data, thermal data, acoustic data, vibrational data, and optical data.

3. The system according to claim 1, wherein the plurality of facility-based sensors comprises at least one vision sensor array configured to transmit pathway alignment vision data on the MVS moving through at least one of the plurality of assembly zones.

4. The system according to claim 1, wherein the plurality of facility-based sensors comprises at least one proximity sensor array configured to transmit at least one of pathway alignment data on the MVS moving through one of the plurality of assembly zones, detection data on the MVS entering one of the plurality of assembly zones, tracking data on the MVS moving through one of the plurality of assembly zones, distance data on the MVS approaching one of the plurality of assembly zones, distance data on the MVS leaving one of the plurality of assembly zones, speed data on at least one object approaching the MVS, location data on at least one object approaching the MVS, and distance data between at least one object and the MVS in one of the plurality of assembly zones, and wherein being located at the predefined distance from the zonal boundary associated with the second assembly zone is based upon the at least one proximity sensor transmitting detection data corresponding to the MVS being located at the predefined distance.

5. The system according to claim 1, wherein the plurality of facility-based sensors comprises:

at least one vision sensor array configured to transmit pathway alignment vision data on the MVS located in one of the plurality of assembly zones; and at least one proximity sensor array configured to transmit at least one of pathway alignment data on the MVS moving through one of the plurality of assembly zones, detection data on the MVS entering one of the plurality of assembly zones, tracking data on the MVS moving through one of the plurality of assembly zones, distance data on the MVS approaching one of the plurality of assembly zones, distance data on the MVS leaving one of the plurality of assembly zones, speed data on at least one object approaching the MVS, location data on at least one object approaching the MVS, and distance data between at least one object and the MVS in one of the plurality of assembly zones.

6. The system according to claim 1, wherein each of the plurality of zone controllers is configured to receive the at least one of the proximity data and vision data and transmit at least one command to the onboard controller of the MVS in response to the received at least one of the proximity data and vision data.

7. The system according to claim 1, wherein the system further comprises:

the transition zone being positioned between a first sensor array and a second sensor array of the plurality of facility-based sensors, wherein the first sensor array is associated with the second assembly zone and the second sensor array is associated with the first assembly zone, and wherein:

the first sensor array and the second sensor array are configured to monitor the MVS moving from the first assembly zone to the second assembly zone, and at least one of the first sensor array and the second sensor array detects the at least one of proximity data and vision data based on monitoring the MVS moving from the first assembly zone to the second assembly zone.

8. The system according to claim 6, wherein the at least one command is at least one MVS operational command, and wherein the at least one MVS operation command is at least one of a path alignment command, a tracking command, and an obstacle avoidance command for the MVS moving through one of the plurality of assembly zones.

9. The system according to claim 1, wherein the plurality of facility-based sensors are configured to wirelessly transmit the at least one of proximity data and vision data to the plurality of zone controllers.

10. The system according to claim 1, wherein each of a plurality of transient data sensors is configured to transmit at least one of performance data, trouble code data, assembly testing data, and proximity data on the MVS moving through one of the plurality of assembly zones.

11. The system according to claim 10, wherein the performance data on the MVS comprises performance data from at least one of a propulsion system, a steering system, a braking system, and a suspension system of the MVS moving through one of the plurality of assembly zones.

12. The system according to claim 1, wherein a plurality of transient data sensors are configured to wirelessly transmit the transient data to the onboard controller.

13. The system according to claim 1 further comprising a central management system configured to receive data from the plurality of zone controllers and transmit at least one MVS command to each of the plurality of zone controllers, wherein the at least one MVS command is a response to the data received from the plurality of zone controllers.

14. The system according to claim 13, wherein the plurality of zone controllers are each configured to transmit the at least one MVS command to the onboard controller of the MVS moving through one of the plurality of assembly zones.

15. The system according to claim 14, wherein the central management system is configured to coordinate movement of a plurality of MVSs moving through the plurality of assembly zones.

16. A facility-based sensory system for manufacture of modular vehicle subassemblies (MVSs), the system comprising:

a plurality of facility-based sensors assigned to a plurality of assembly zones such that each of the plurality of assembly zones has at least one of the plurality of facility-based sensors assigned thereto, wherein the plurality of facility-based sensors is configured to detect proximity data or vision data associated with an MVS moving through a transition zone disposed between a first assembly zone and a second assembly zone;

a plurality of zone controllers assigned to the plurality of assembly zones such that each of the plurality of assembly zones has at least one of the plurality of zone controllers assigned thereto, wherein each of the plurality of facility-based sensors assigned to a given assembly zone is configured to be in communication with and transmit the proximity data or the vision data to at least one of the plurality of zone controllers assigned to the given assembly zone; and a plurality of transient data sensors and an onboard controller configured to be attached to the MVS, wherein each of the plurality of transient data sensors is configured to transmit transient signals from the MVS to the onboard controller, and the onboard controller establishes a communication link with a first zone controller of the plurality of zone controllers in response to being located at a predefined distance from a zonal boundary associated with the second assembly zone based on the proximity data or the vision data received from one or more sensors of the plurality of facility-based sensors configured as proximity sensors and positioned in the transition zone, and wherein the onboard controller terminates a communication link with a second zone controller of the plurality of zone controllers in response to the establishment of the communication link with the second assembly zone, and further wherein the first zone controller is associated with the second assembly zone and the second zone controller is associated with the first assembly zone, and wherein the onboard controller is configured to receive the transient signals and transmit transient data to the first zone controller or the second zone controller such that manufacturing information on the MVS moving through the plurality of assembly zones is detected and transmitted.

17. The system according to claim 16, wherein the plurality of facility-based sensors comprises at least one of:

a plurality of vision sensor arrays configured to transmit pathway alignment vision data on the MVS moving through the plurality of assembly zones; and a plurality of a proximity sensor arrays configured to transmit at least one of pathway alignment data on the MVS moving through one of the plurality of assembly zones, detection data on the MVS entering one of the plurality of assembly zones, tracking data on the MVS moving through one of the plurality of assembly zones, distance data on the MVS approaching one of the plurality of assembly zones, distance data on the MVS leaving one of the plurality of assembly zones, speed data on at least one object approaching the MVS, location data on at least one object approaching the MVS, and distance data between at least one object and the MVS moving through the plurality of assembly zones.

18. The system according to claim 17 further comprising a central management system configured to receive data from the plurality of zone controllers and transmit at least one MVS command to each of the plurality of zone controllers, wherein the at least one MVS command is a response to the data received from the plurality of zone controllers, and the plurality of zone controllers are each configured to transmit the at least one MVS command to the onboard controller of the MVS moving through one of the plurality of assembly zones.

19. A facility-based sensory system for manufacture of modular vehicle subassemblies (MVSs), the system comprising:

a plurality of facility-based sensors assigned to a plurality of assembly zones such that each of the plurality of assembly zones has at least one of the plurality of facility-based sensors assigned thereto, wherein the plurality of facility-based sensors is configured to detect proximity data or vision data associated with an MVS moving through a transition zone disposed between a first assembly zone and a second assembly zone;

a plurality of zone controllers assigned to the plurality of assembly zones such that each of the plurality of assembly zones has at least one of the plurality of zone controllers assigned thereto, wherein each of the plurality of facility-based sensors assigned to a given assembly zone is configured to be in communication with and transmit the proximity data or the vision data to at least one of the plurality of zone controllers assigned to the given assembly zone;

a plurality of transient data sensors and an onboard controller configured to be attached to an MVS, wherein each of the plurality of transient data sensors is configured to transmit transient signals from the MVS to the onboard controller, and the onboard controller establishes a communication link with a first zone controller of the plurality of zone controllers in response to being located at a predefined distance from a zonal boundary associated with the second assembly zone based on the proximity data or the vision data received from one or more sensors of the plurality of facility-based sensors configured as proximity sensors and positioned in the transition zone, and wherein the onboard controller terminates a communication link with a second zone controller of the plurality of zone controllers in response to the establishment of the communication link with the second assembly zone, and further wherein the first zone controller is associated with the second assembly zone and the second zone controller is associated with the first assembly zone, and wherein the onboard controller is configured to receive the transient signals and transmit transient data to the first zone controller or the second zone controller such that manufacturing information on the MVS moving through the plurality of assembly zones is detected and transmitted; and a central management system configured to receive data from the plurality of zone controllers and transmit at least one MVS command to each of the plurality of zone controllers, wherein the at least one MVS command is a response to the data received from the plurality of zone controllers, and the plurality of zone controllers are each configured to transmit the at least one MVS command to the onboard controller of the MVS moving through one of the plurality of assembly zones.

20. The system according to claim 19, wherein the plurality of facility-based sensors comprises:

at least one vision sensor array configured to transmit pathway alignment vision data on the MVS located in one of the plurality of assembly zones; and at least one proximity sensor array configured to transmit at least one of pathway alignment data on the MVS moving through one of the plurality of assembly zones, detection data on the MVS entering one of the plurality of assembly zones, tracking data on the MVS moving through one of the plurality of assembly zones, distance data on the MVS approaching one of the plurality of assembly zones, distance data on the MVS leaving one of the plurality of assembly zones, speed data on at least one object approaching the MVS, location data on at least one object approaching the MVS, and distance data between at least one object and the MVS in one of the plurality of assembly zones.

* * * * *